United States Patent [19]

Schneebeli et al.

[11] Patent Number: 5,233,150
[45] Date of Patent: Aug. 3, 1993

[54] METHOD OF PRODUCTION OF WORKPIECES BY WELDING EQUIPMENT

[75] Inventors: Fritz Schneebeli, Oberengstringen; Olivier Braun; Bruno Tanner, both of Winterthur; Roger Dekumbis, Zürich, all of Switzerland

[73] Assignee: Sulzer Brothers Limited, Winterthur, Switzerland

[21] Appl. No.: 822,254

[22] Filed: Jan. 17, 1992

[30] Foreign Application Priority Data

Jan. 21, 1991 [CH] Switzerland ............... 00164/91

[51] Int. Cl.$^5$ .............................. B23K 9/04
[52] U.S. Cl. .................. 219/76.14; 228/119; 228/102; 219/125.1
[58] Field of Search ............ 228/119, 102, 8, 9, 228/11; 219/121.14, 121.64, 121.83, 125.1, 76.14–76.16; 29/889.1, 889.7

[56] References Cited

U.S. PATENT DOCUMENTS

| Re. 29,815 | 10/1978 | Gnanamuthu | 219/121.64 |
|---|---|---|---|
| 4,125,943 | 11/1978 | Ando | 228/9 X |
| 4,621,762 | 11/1986 | Bronowski | 228/119 X |
| 4,671,448 | 6/1987 | Million | 228/119 |
| 4,775,092 | 10/1988 | Edmonds et al. | 228/222 |
| 4,959,523 | 9/1990 | Fihey et al. | 228/102 X |
| 4,998,005 | 3/1991 | Rathi et al. | 219/121.64 X |
| 5,038,014 | 8/1991 | Pratt et al. | 219/121.64 |
| 5,155,324 | 10/1992 | Deckard et al. | 219/121.64 |
| 5,160,822 | 11/1992 | Aleshin | 219/121.64 |

FOREIGN PATENT DOCUMENTS

| 0170780 | 4/1985 | European Pat. Off. |
|---|---|---|
| 89098404 | 8/1989 | Fed. Rep. of Germany |
| 137188 | 6/1987 | Japan ............... 228/9 |

Primary Examiner—Kenneth J. Ramsey
Attorney, Agent, or Firm—Townsend and Townsend Khourie and Crew

[57] ABSTRACT

Starting on the surface of a foundation body (2) weld material is applied in runs to form layers by an equipment for profiling building-up welding and hence a workpiece (1) is manufactured, where the foundation body (2) may be a component of the workpiece (1). The course of runs to form layers as well as the approximate rate of application of weld material are calculated by a computer system (11), starting from a two- or three-dimensional data model of the workpiece (1) in the form of software, and given over to the system control (10) which positions the welding torch (7) by means of the robot (5) and the workpiece (1) located on a turntable (4) by a clamping mechanism (3) with respect to one another, and regulates the rate of application of weld material applied by the welding apparatus (8) in such a way that the liquid weld material adheres to the layer lying underneath without running down and irregularities in the runs to form layers are levelled out. Hence metal workpieces having manifold bodily shapes and theoretically of any size and having any thickness of wall, even consisting of different metallic materials, may be manufactured by profiling building-up welding without auxiliary cores or other devices supporting the liquid weld material.

23 Claims, 4 Drawing Sheets

METHOD OF PRODUCTION OF WORKPIECES BY WELDING EQUIPMENT

BACKGROUND OF THE INVENTION

The invention is concerned with the method of production of metal workpieces by a welding equipment, in particular workpieces of highly heat-treated materials and a mechanism for the performance of the method.

The practice is known of producing metal workpieces by welding methods, in particular by the profiling method of building-up welding. Such a method consists in the weld material, usually fed in as rods or endless wire, being deposited in runs layer by layer until the desired geometry of the workpiece is reached. For supporting the liquid molten welding material a metallic prefabricated supporting body is usually employed upon which the first layer of weld material is deposited. Thus, e.g., for a cylindrical workpiece a cylinder is employed as the supporting body. Hence the supporting body determines the general shape of the cross-section of a workpiece which is to be produced. What makes it disadvantageous is that for every workpiece a prefabricated supporting body must correspond geometrically to the workpiece. Since the supporting body is connected metallically to the applied layers of weld material, it must under certain circumstances be removed again.

For supporting the liquid weld material the U.S. Pat. No. 4,775,092 employs a cooled cylindrical roller which acts as a support only until the weld material has solidified. Hence a prefabricated supporting body is no longer necessary. But a decisive disadvantage of this method is that only axially symmetrical workpieces can be produced.

Known mechanisms for the profiling building-up welding of workpieces are capable of producing small and also large and correspondingly heavy workpieces which, however, as regards shape are of relatively simple design, predominantly axially symmetrical, or are assembled from such shapes.

The problem of the present invention is therefore to deposit runs of weld material of any, even three-dimensional curved shapes and largely constant quality in a simple way so that workpieces arise of practically any shapes in such a way that no supporting body or special manipulator is necessary for supporting the molten weld material.

SUMMARY OF THE INVENTION

The method of profiling building-up welding of workpieces, in accordance with the invention, also designated below the free-shape method or free-shape welding, becomes possible thanks to a combination of building-up welding technology, computer technology and robotry. The methods of welding applied and also the metallic materials employed are known. Arc welding methods or laser beam welding methods may be applied as the methods of welding.

Powerful CAD computer programs allow the design of complex two- or three-dimensional models of workpieces which by means of the free-shape method may be produced directly as metal workpieces. In doing so the workpiece is usually split up into a foundation body and a plurality of runs of weld material which at the start are deposited on the foundation body and hence yield the shape of the workpiece. The foundation body serves as the carrier of a first layer of weld material. The whole workpiece is built up on the foundation body by the deposition of runs of weld material, in which case the foundation body may be a prefabricated component part of the final workpiece, e.g., a hub, or a component, e.g., a plate which is separated again from the workpiece in a succeeding working step. The foundation body and/or the welding torch depositing the weld material are movable in space in two or three dimensions, preferably by means of robots. The target values of the computing machinery for the control and welding data are fed into a system control which continuously controls and monitors the robot or robots and the welding equipment during the production of the metal workpiece and levels out deviations.

The free-shape welding is performed without any supporting body supporting the liquid weld material, in such a way that a newly deposited liquid run of weld material adheres to the run lying below and does not run down under any circumstances. A preferably vertical application of weld material on an element of run inclined only a little with respect to the horizontal reduces the risk of the weld material running down. The system control therefore continuously regulates the geometrical position of the substrate to a run of weld material which is to be applied and/or the position of the welding torch as well as the rate of application of weld material to be applied and/or the speed of the run of weld. Areal layers may be produced by, e.g., a higher rate of application of weld material and, e.g., meandering weld runs, while, e.g., boundaries of a workpiece, because of the risk of running off, are produced at a reduced rate of application of weld material.

The rate of application of weld material is in addition regulated in such a way that irregularities in existing runs of weld material are detected as regards width and/or height and levelled out by the newly applied run of weld material. By arc welding methods irregularities can be established relatively simply by monitoring weld parameters such as welding current and welding voltage. For laser welding methods more exacting mechanical or optical sensors are necessary in order to detect irregularities in existing runs of weld material. For doing that by the laser welding method runs of weld inclined even far from horizontal may be applied without risk of running down if the bath of melt is small and hence is held by the surface tension.

In theory workpieces of any size can be manufactured by the free-shape method. As compared with the method of casting, workpieces produced by building-up welding exhibit better mechanical properties since the rate of cooling of the metal is better able to be checked and grain structures which are more homogeneous can thus be achieved. Therefore, e.g., even workpieces having large differences in wall thickness may be produced with less problem than by the method of casting. Free-shape welding may replace known methods of production of metal workpieces such as casting or forging or be used in combination with known methods. A workpiece may be built up of one or even more weldable metals and/or metal alloys by, e.g., after the production of a metal core, applying a high-quality metal covering layer. Workpieces may be produced having mechanical, physical and corrosion-related properties specified by the customer. The method of free-shape welding in accordance with the invention is suitable, e.g., for the rapid production of individual high-quality workpieces such as are needed in the building of prototypes, for the repair of workpieces such as Pelton buckets and also for the production of complex workpieces such as whole Pelton wheels.

With a mechanism for profiling building-up welding, weld material is applied in runs to form layers, starting on the surface of a foundation body, and hence a workpiece is manufactured in which the foundation body may be a component of the workpiece. The course of runs to form layers as well as the approximate rate of application of weld material are calculated by computing machinery, starting from a two- or three-dimensional data model of the workpiece in the form of software and passed over to the system control which positions the welding torch by means of the robot and the workpiece located on a positioning mechanism, a turntable with a clamping mechanism, with respect to one another, and on the welding apparatus regulates the rate of application of the weld material applied, in such a way that the liquid weld material adheres to the underlying layer without running off and irregularities in the runs forming the layers are levelled out. Hence metal workpieces having manifold shapes of body, theoretically of any size and with any thicknesses of wall, even consisting of different metallic materials, may without auxiliary cores or other devices supporting the liquid weld material be manufactured by profiling building-up welding.

The invention will now be explained with the aid of examples in which as the welding equipment an arc welding equipment, in particular with metal electrode inert gas (MIG), is used. It may be understood and should be obvious to one skilled in the art that other welding equipment such, e.g., laser beam welding equipment can be used. In such a case a sensor is employed for determination of the relative positions of the welding equipment and the substrate.

DESCRIPTION OF THE PREFERRED EMBODIMENTS

Figure 1:
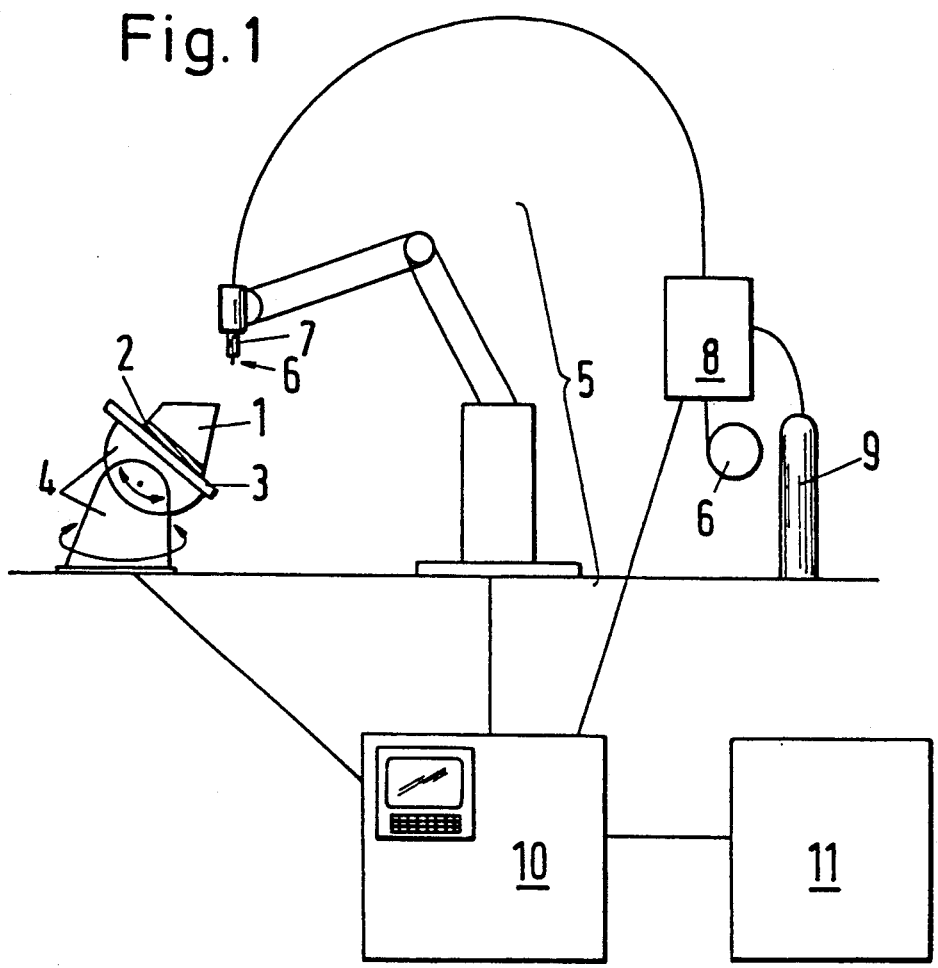
FIG. 1 is an elevational view of an installation for the performance of the new method.

FIG. 1 shows the building-up welding equipment for the production of metal workpieces.

The workpiece 1 is applied by profiling building-up welding to an electrically conductive foundation body 2. The foundation body 2 is either a component of the final workpiece 1, e.g., a hub of metallic material, or an auxiliary body which in a suceeding working step is separated from the workpiece. A clamping mechanism 3 which, depending upon the application, is also capable of being cooled and/or heated, locates the foundation body 2. The workpiece may also be cooled or heated by other devices not shown, preferably by an air nozzle for cooling or a gas burner for heating. For the production of complex workpieces 1 a three-dimensionally movable clamping mechanism 3 may be necessary, which is controlled by a system control 10. In the present example a turntable movable in rotation about two axes is used as the positioning mechanism 4.

The welding torch 7 is supplied from the welding apparatus 8 with power, welding wire 6 and protective gas 9. The system control 10 positions the welding torch 7 by means of the robot 5 and the workpiece 1 by means of the turntable in such a way that the tangent to the element of layer which is to be applied in the form of runs preferably lies roughly horizontal and with the welding torch vertical or within a range of angle of about ±10° to the vertical is welded with a slight push or pull. In addition the system control 10 regulates the rate of application of the weld material applied according to a concept described in FIG. 4. Starting from a three-dimensional model of the workpiece 1, the computer system 11 calculates the course of the runs of weld material to form the layers and in the event of its being necessary the dimensions of the foundation body 2 as well as an approximate rate of application of weld material and/or speed of the run of weld and delivers the values to the system control 10.

Figure 2:
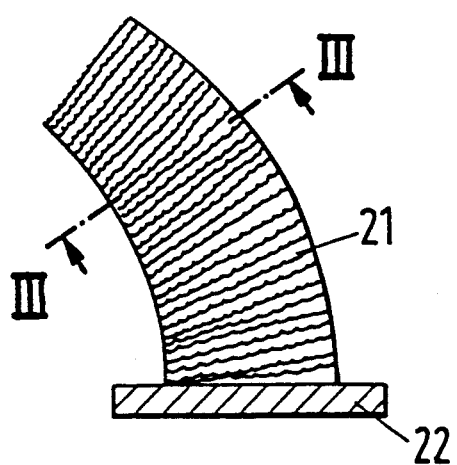
FIG. 2 is a side elevation of a workpiece produced.

An example of a workpiece may be seen in FIG. 2. Weld material is applied, preferably continuously, to the foundation body 22 in runs to form layers, so that the body of the workpiece 21 is formed. The ripple in the surface of the untreated surfaces of the workpiece is less than ±1 mm.

Figure 3:
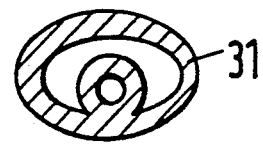
FIG. 3 is the cross-section of a workpiece produced.

FIG. 3 shows a cross-section 31 through the workpiece 21. Workpieces consisting of planes, oblique layers, solid bodies, hollow bodies and/or closed cavities may also be produced, whereby through free-shape welding bodies of almost any shape may be produced. The minimum realizable wall thickness of the cross-section 31 of workpiece amounts to 4 mm for the arc welding equipment used, or 0.8 mm in the case of the employment of a laser beam welding equipment. Any greater wall thicknesses may be achieved through the application of additional layers of weld material.

Figure 4:
FIG. 4 is a graph of the trend in the height of layers of weld material as an example of the concept of regulation employed.

In the graph of FIG. 4 the concept of regulation from the system control 10 is illustrated, which allows irregularities in layers formed in runs to be compensated by the next overlying layer of weld material. A segment from two layers formed in runs of weld material, lying one above the other on the workpiece 21 (FIG. 2), is represented, the length 1 of run along the layers lying one above the other being plotted as abscissa, and the total height h of the layers as ordinate.

From FIG. 2 it is clear that the shape of the workpiece 21 demands a wedge-shaped trend in the thickness of layer which increases towards the right. The runs to form the layers are preferably applied in such a way that the new layer lies roughly horizontal. In order to apply the layer 42 horizontally, the existing layer 41 was therefore brought into a position lying correspondingly in the shape of a wedge. From the computer system 11 the course of the runs of weld material forming the layers as well as the approximate rate of application of weld material and/or the speed of the run of weld is predetermined in the sense of a control. The trend of the height of layer of the underlying layer 41, expressed as a differential, the distance from the contact nozzle 501

(FIG. 5) of the welding torch to the metal surface of the workpiece lying nearest, may be determined continuously during the welding process by the system control 10 through the measurement of welding parameters, preferably welding current and welding voltage. The system control 10 preferably regulates the rate of application of weld material and/or the speed of the run of weld in such a way that the distance between the contact nozzle 501 and the newly applied run of weld material is kept constant so that irregularities are levelled out.

Runs of weld material are preferably applied in a roughly horizontal position because in this position the liquid weld material shows the most levelling action with respect to irregularities. The system control 10 is anxious, e.g., during the next succeeding horizontal process of building-up welding, represented by the trend 42 in the height of layer, to maintain a constant distance between the contact nozzle 501 and the newly applied run of weld material and hence to level out irregularities such, e.g., as holes or a wedge shape in the existing layer 41 through a variation in the rate of application of weld material and/or the speed of the run of weld, so that the resulting trend in the height of layer of the new layer 42 corresponds as far as possible with the predetermined preferably horizontal trend. This regulating concept guarantees that the run of weld material applied corresponds with the predetermined trend or in the event of deviations occurring the application of material by the next overlying run of weld material is automatically stabilized in such a way that the overlaid run of weld material corresponds as far as possible with its predetermined course without a report back to the master computer system (11) having to be effected. Depressions or holes up to 3 mm deep may be levelled out by an increased application of weld material.

Figure 5:
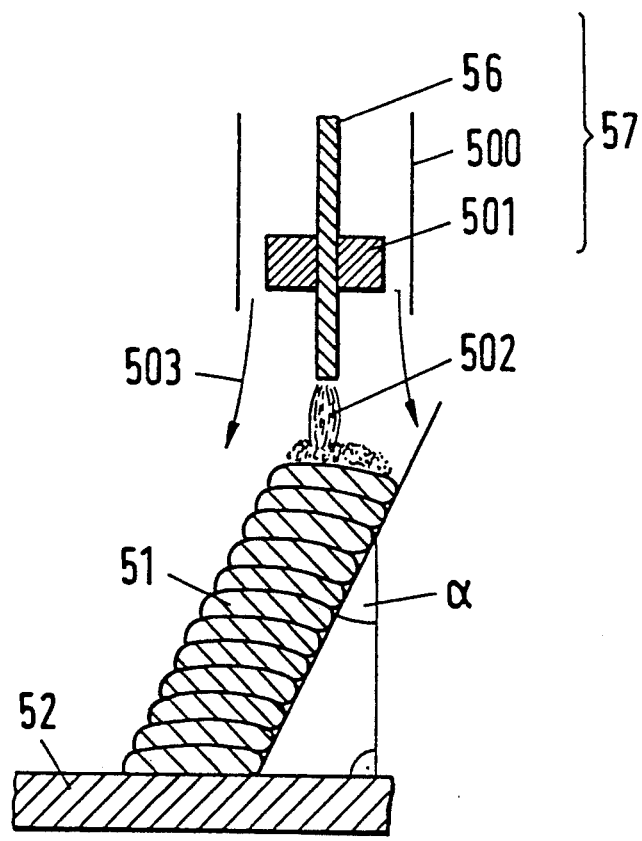
FIG. 5 is an elevation of building-up welding of overhanging walls.

FIG. 5 shows a vertical section through a foundation body 52 as well as a workpiece 51 with overhanging layers formed by runs of weld material. It likewise shows the welding torch 57 with the outer sleeve 500, the contact nozzle 501 supplying the welding wire 56 with electricity, the arc 502 with liquid weld material as well as an indication of the course of flow of the protective gas 503. An approximate rate of application of weld material is predetermined by the computer system 11. During the welding process the welding voltage lying between the contact nozzle 501 and the workpiece 51 and the welding current flowing via the welding wire 56 and the arc 502 enable continuous determination of the distance of the contact nozzle 501 from the surface of the workpiece 51, which serves for the determination of the effective rate of application of weld material and/or the speed of the run of weld.

If the rate of application of weld material from the welding torch 57 is proportioned in such a way that the liquid material does not run down, which may be determined by corresponding experiments, on a foundation body 52 movable in two dimensions but at most horizontally, layers of weld material overhanging with respect to the vertical tangent to the workpiece 51 by an angle α of up to 33° to the vertical may be achieved without supporting bodies. Any angle α of overhang may be achieved through appropriate three-dimensional positioning of the workpiece 51.

Figure 6:
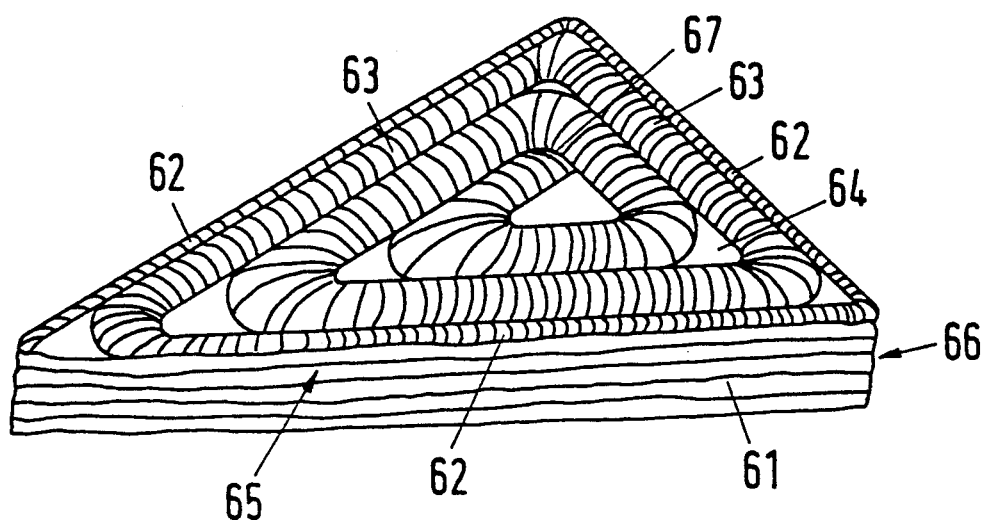
FIG. 6 is an example of a filling strategy for the production of a workpiece.

FIG. 6 shows an example of a possible filling strategy for the production of a workpiece. The triangular solid body is built up of layers 61. For reduction of the surface ripple 65 in the workpiece as well as for the generation of the sharpest possible edges 66 it is advantageous to apply a thin run 62 of weld material, e.g., enclosing the contour of the workpiece, and to fill the remaining inner area with coarser runs 63 of weld material. In doing so, as drawn enlarged out of proportion for clarity, depressions 64 may arise in any layer without any application of weld material. The next succeeding run of weld material, starting preferably at the end point 67, will therefore exhibit a different filling strategy from the preceding layer. The ability of the system control 10 to level out irregularities in the trend in the height of layer brings it about that depressions 64 are filled with weld material by the next layer and hence a solid body without holes may be produced.

Figure 7:
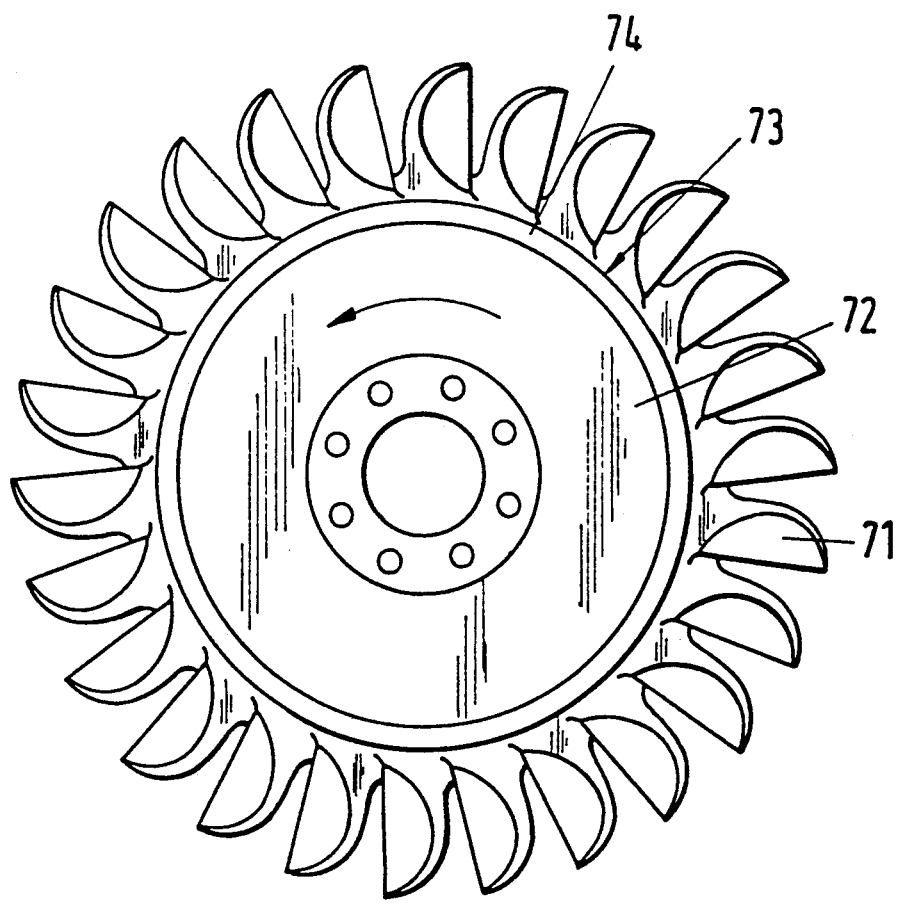
FIG. 7 is a side elevation of a Pelton wheel produced with the method of the invention.

FIG. 7 shows a Pelton wheel manufactured by the method in accordance with the invention. As the foundation body a hub 72 is used which is, e.g., forged. In a succeeding working step an intermediate layer 74 of high-quality metal may be applied to the foundation body by a suitable building-up method of welding. On the lightly premachined surface 73 next to the buckets the individual buckets 71 are applied in accordance with the method by free-shape welding.

Figure 8A:
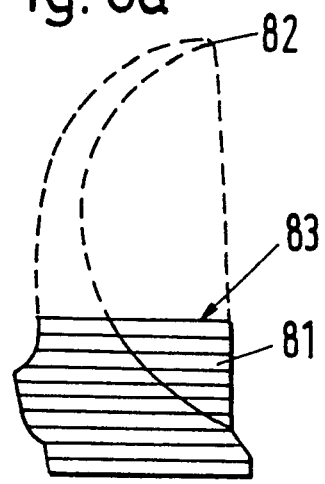
FIGS. 8a, 8b and 8c are the side elevations of a Pelton bucket during three different stages of production.
Figure 8B:
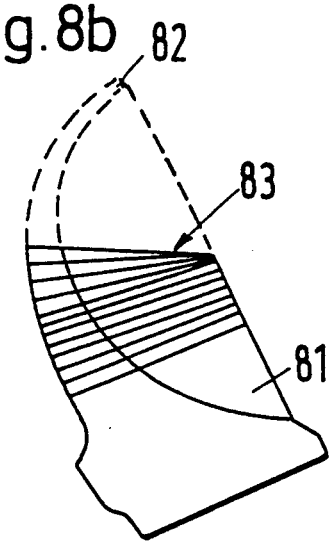
Figure 8C:
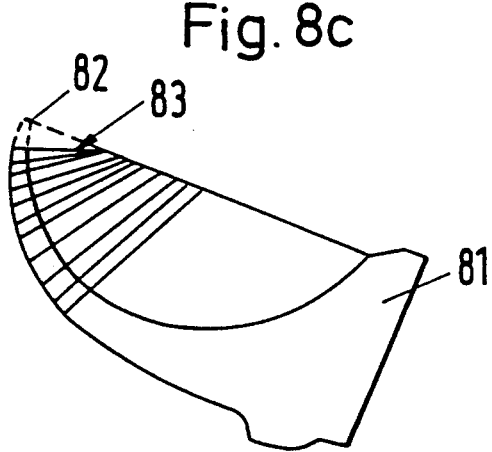

FIGS. 8a, 8b and 8c show a side elevation of a Pelton bucket during three phases of the production process. The workpiece 81 is built up in layers by free-shape welding, the layer 83 to be applied last at any time preferably being brought to lie horizontally by the workpiece 81 being tilted accordingly. Layers of weld material are applied until the shape of the Pelton bucket 82 is achieved. During production, through the possibility of a free choice of working tempo and other suitable measures such, e.g., as cooling, heating or interruption of the free-shape welding, a temperature of the bucket which is too high or too low may be avoided and as is important for the grain structure, similar cooling conditions may be achieved. The profiling building-up welding may be interrupted by other machining processes on the workpiece, e.g., for the machining of the surface by a milling machine at some point in time when the surfaces to be machined are still advantageously accessible. During the production of a Pelton wheel, e.g., part of a bucket may be produced by free-shape welding and other buckets on the wheel be processed, e.g. mechanically, at the same time.

Figure 9:
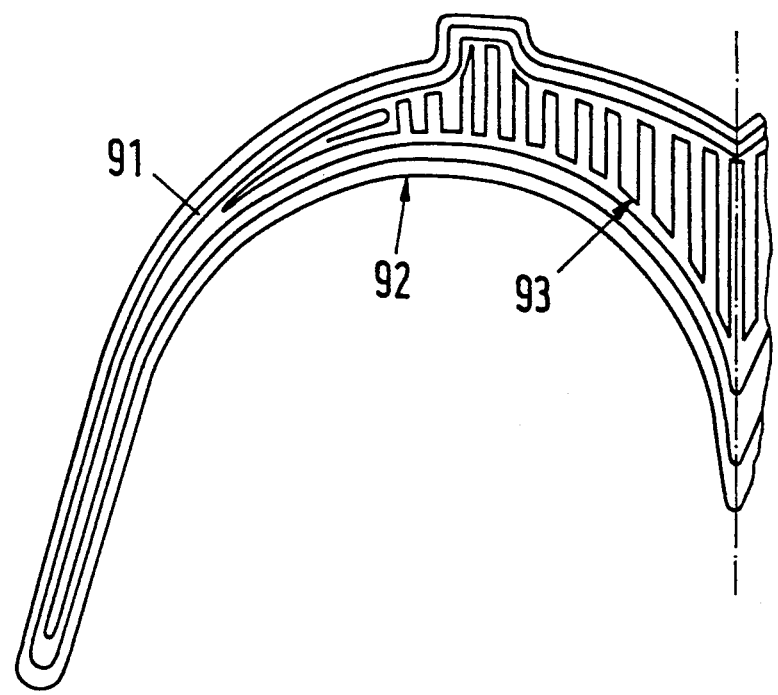
FIG. 9 is a cross-section view through a Pelton bucket illustrating an example of the course of a run of weld material.

FIG. 9 is a cross-section through a Pelton bucket and shows an example of a possible course of a run of weld material over a layer of weld material. Besides the runs 92 bounding the contour of the workpiece runs 91, 93 may be applied in any form. The filling strategy established by the computer system 11 for the two- or three-dimensional data model of the workpiece in the form of software allows a plurality of possible filling strategies so that the strategy of the layer formation represented in FIG. 8 or the course of a run of weld material represented in FIG. 9 are to be considered only as examples of one possible realization. Not only plane but also three-dimensional courses of layers and runs may be realized.

What is claimed is:

1. A method of free-shape welding to form a rotationally asymmetric workpiece of any desired shape comprising the steps of providing a foundation body having a build-up surface for forming the workpiece thereon; determining a base-outline of the workpiece; positioning a weld head proximate the build-up surface of the foundation body; moving the foundation body relative to the weld head within the workpiece base-outline;

activating the weld head to deposit metal by metal electrode inert gas (MIG) welding on the build-up surface and thereby form a first metal layer on the foundation body surface having the shape of the base-outline; thereafter moving the weld head and the foundation body relative to each other generally transversely to the first metal layer; determining another outline of the workpiece; and moving the foundation body relative to the weld head within the other workpiece outline while weld-depositing metal on top of the first metal layer to form at least a second metal layer on top of the first metal layer to thereby finish form the workpiece.

2. A method according to claim 1, including the step of sensing surface discontinuities in a previously formed metal layer by monitoring at least one welding parameter selected from the group of welding parameters consisting of welding current and welding voltage.

3. A method of free-shape welding a Pelton wheel bucket on a hub, the method comprising the steps of determining a base-outline for the bucket on the hub; positioning a weld head proximate the hub; moving the hub relative to the weld head within the bucket base-outline; activating the weld head for weld-depositing metal on the hub and thereby forming a first metal layer thereon having the shape of the base-outline; thereafter moving the weld head and the hub relative to each other generally transversely to the first metal layer; determining another outline of the bucket; moving the hub relative to the weld head within the other bucket outline; weld-depositing metal on top of the first metal layer to form a second metal layer on top of the first metal layer; and repeating the steps of determining, moving the hub relative to the weld head, and weld-depositing metal on top of previously formed metal layers to thereby finish form the bucket, the step of moving for at least one of the metal layers including the step of tilting the hub relative to the weld head to angularly incline a top surface of a most recently formed metal layer relative to a horizontal plane, and the step of weld-depositing comprising the step of weld-depositing metal on top of said most recently formed metal layer so that the layer being deposited forms a top surface lying in a substantially horizontal plane.

4. A method of free-shape welding to form a rotationally asymmetric workpiece of any desired shape comprising the steps of:
   providing a foundation body defining a welding surface for forming the workpiece thereon;
   determining a two-dimensional base outline for the workpiece;
   positioning a weld head proximate the welding surface, the weld head being adapted to form a bead of welded metal on the weld surface;
   moving the foundation body and the weld head relative to each other within the confines of said workpiece outline and simultaneously activating the weld head to deposit said metal bead on the welding surface of the foundation body until a first metal layer with a shape of the base-outline has been formed on the welding surface; and
   depositing at least one additional layer of metal over the first metal layer by
      (i) determining an additional outline and a relative position for the additional metal layer from the desired shape of the workpiece;
      (ii) activating the weld head to deposit by metal electrode inert gas (MIG) welding a further weld bead on the first metal layer; and
      (iii) moving the foundation body relative to the weld head so that the further weld bead is deposited on the first layer within and at the relative position of the additional outline only;
   whereby the finished workpiece will have the desired rotationally asymmetric, three-dimensional shape.

5. A method according to claim 4 wherein the first mentioned moving step includes the steps of initially forming a contour bead on the welding surface by moving the foundation body and the weld head relative to each other along the base-outline, and thereafter moving the foundation body and the weld head relative to each other along a path contained within the contour bead until the first metal layer is formed.

6. A method according to claim 5 wherein step (iii) includes the step of initially moving the foundation body and the weld head relative to each other along the outline for the additional metal layer to deposit an additional contour bead on the first metal layer, and thereafter moving the foundation body relative to the weld head along a path contained within the additional contour bead until the additional metal layer is formed.

7. A method according to claim 4 wherein the base-outline and the additional outline are identical in shape.

8. A method according to claim 4 wherein the base-outline and the additional outline differ in shape.

9. A method according to claim 4 wherein the welding surface is planar and the base-outline and the additional outline are offset from each other with respect to a line that is perpendicular to the welding surface of the foundation body, whereby a surface of the finished workpiece extending away from the welding surface is nonperpendicular to the welding surface.

10. A method according to claim 4 wherein the outlines include at least one concavely curved section, at least one convexly curved section, and at least one section which connects the concavely and convexly shaped outline sections.

11. A method according to claim 4 wherein the outlines include first and second outline sections which are angularly inclined with respect to each other, converge and at their point of convergence define a workpiece corner.

12. A method according to claim 4 including the step of varying a height of at least a portion of at least one of the metal layers deposited by the weld head.

13. A method according to claim 4 wherein at least one of the metal layers has a substantially constant height.

14. A method according to claim 4 wherein at least one of the metal layers has a substantially constant height and at least one of the deposited metal layers has a variable height.

15. A method according to claim 4 including the step of varying a height of the metal bead deposited by the weld head during the formation of a metal layer.

16. A method according to claim 15 wherein the step of varying comprises the step of modulating a rate at which the weld head forms the metal bead.

17. A method according to claim 15 wherein the step of varying comprises the step of changing the speed with which the foundation body is moved relative to the weld head.

18. A method according to claim 17 including the step of adjusting the rate at which the weld bead is deposited when the weld head is at a surface discontinuity so that a surface of the metal layer being formed is substantially continuous.

19. A new method according to claim 4 wherein the workpiece has a portion which is cup-shaped.

20. A method according to claim 4, including the step of sensing surface discontinuities in a previously formed metal layer by monitoring at least one welding parameter selected from the group of welding parameters consisting of welding current and welding voltage.

21. A method of free-shape welding to form a rotationally asymmetric workpiece of any desired shape by depositing successive metal layers on top of each other comprising the steps of:

(a) computer modelling a three-dimensional shape for the workpiece including establishing a planar, two-dimensional base-outline for the workpiece and the shapes and relative positions for all additional metal layers to be deposited on top of each other to form the desired workpiece;

providing a foundation body including a welding surface;

providing a weld head for depositing a bead of metal by welding;

providing robot means operatively coupled with the foundation body and the weld head for three-dimensionally moving the body of the bead with respect to each other; and activating the robot means to initially move the welding surface relative to the weld head within the base outline of the workpiece while energizing the weld head to deposit by metal electrode inert gas (MIG) welding a weld bead until a first metal layer is formed on the welding surface in the shape of the base outline, and thereafter to move the foundation body and the weld head relative to each other while continuing to energize the weld head to deposit weld beads on the first layer to form all additional metal layers with the predetermined outlines and at the relative positions;

whereby the workpiece of the desired shape is obtained following completion of a last metal layer.

22. Apparatus for free-shape welding a rotationally asymmetric workpiece of any desired shape comprising:

a workpiece holder including means for holding a foundation plate;

a metal electrode inert gas (MIG) weld head positioned proximate the foundation plate for depositing a metal in liquid form on the foundation plate;

modelling means for generating a plurality of outlines for the workpiece so that all outlines together define the shape of the workpiece; and robot means operatively coupled with the work table and the weld head for three-dimensionally moving the foundation plate and the weld head relative to each other, the robot means being further operatively coupled with the modelling means for guiding relative movements between the foundation plate and the weld head along paths wholly contained within said outlines to deposit weld beads on the foundation body which are wholly contained within said outlines and which sequentially form a first metal layer on a welding surface of the foundation body and all additional metal layers, one on top of the other;

whereby, upon the completion of a last layer, a workpiece having the desired rotationally asymmetric, three-dimensional shape is formed.

23. Apparatus according to claim 22 including sensor means for sensing surface discontinuities in a most recent formed metal layer by monitoring at least one welding parameter selected from the group of welding parameters consisting of welding current and welding voltage, and means, operatively coupled with the sensor means, for adjusting the rate with which the weld head deposits metal when the weld head is over a sensed surface discontinuity to correspondingly adjust a height of the metal layer being formed at the surface discontinuity so that the metal layer being formed has a continuous surface.

* * * * *